United States Patent [19]

McClelland

[11] 4,018,995
[45] Apr. 19, 1977

[54] NOISE SUPPRESSION CIRCUIT FOR SWITCHED TELEPHONE LINES

[75] Inventor: Harold Grant McClelland, Manotick, Canada

[73] Assignee: Northern Electric Company Limited, Montreal, Canada

[22] Filed: Jan. 29, 1976

[21] Appl. No.: 653,294

[52] U.S. Cl. .............................................. 179/79
[51] Int. Cl.² ........................................... H04B 3/02
[58] Field of Search ........... 179/78 R, 79, 174, 1 P, 179/1 SW, 1 MN; 320/1; 178/69 F

[56] References Cited

UNITED STATES PATENTS 3,391,252  7/1968  Germanton ................... 179/18 AH Primary Examiner—William C. Cooper
Attorney, Agent, or Firm—Frank Turpin

[57] ABSTRACT

A circuit for suppressing noise pulses generated by the transfer of a charged telephone line from one supervisory circuit to another is provided. A capacitor is first connected to the telephone line and is charged to the voltage level appearing across the telephone line at the one supervisory circuit. The telephone line is then transferred from the one supervisory circuit to the other supervisory circuit and the capacitor is disconnected from across the line.

12 Claims, 3 Drawing Figures

NOISE SUPPRESSION CIRCUIT FOR SWITCHED TELEPHONE LINES

This invention relates to telephone systems in general and more particularly to a method and apparatus for suppressing electrical noise generated by the transfer of a charged subscriber line from one supervisory circuit to another.

The comtemporary telephone switching systems provide subscribers with a large variety of special services. In order to provide some of these services, it is often necessary to switch the supervisory circuit associated with an established call to a supervisory circuit associated with a special service circuit. This action should be undetectable to the parties of the established call. However, such is not the case in existing systems.

When a subscriber telephone line is connected to a supervisory circuit in a central office, the voltage level at the junction of the telephone line and the supervisory circuit is dependent on the length of the subscriber loop. Under these circumstances, the telephone line is said to be charged. When it becomes necessary to transfer a charged line from one supervisory circuit to another, large spike or noise pulses are generated mostly because of the effective reactive components of the line and the supervisory circuits. These voltage spikes are perceived by the parties to the established call as a series of sharp loud noises. In the existing systems, the efforts directed at minimizing these noise pulses have proven to be only marginally effective.

The generation of noise occurring on the switching of charged lines is also a problem in other systems. In those systems, the problem is most often solved by pre-charging the affected paths by the applicaiton of a predetermined direct current voltage of the paths before using them. However, this solution is not useable in telephone transmission paths because the subscriber loop length varies from one loop to the next and therefore the voltage level at the supervisory circuits vary accordingly. The allowable minimum and maximum loop lengths of the telephone system can cause the voltage level at a supervisory circuit in the switching office to vary from about twelve volts to about forty-two volts. In order to solve this problem, the invention provides a circuit which prevents a telephone line in use from discharging while it is being transferred from one supervisory circuit to another.

In accordance with the invention, there is provided in telephone apparatus comprising a first supervisory circuit, a subscriber telephone line connected thereto, a second supervisory circuit, and means for transferring the telephone line from the first to the second circuit, a circuit for suppressing noise pulses generated upon the transfer. A capacitor is connected to a switch means which causes it to be connected across the telephone line and to be charged to the voltage level existing thereon before it is transferred to the second circuit. The switch means includes means for disconnecting the capacitor from the telephone line a predetermined interval of time subsequent to the transfer.

From another aspect, the invention provides a method of preventing noise pulses from being generated when a charged telephone line is transferred from one supervisory circuit to another.

An example embodiment of the invention will now be described in conjunction with the drawings in which.

Figure 1:
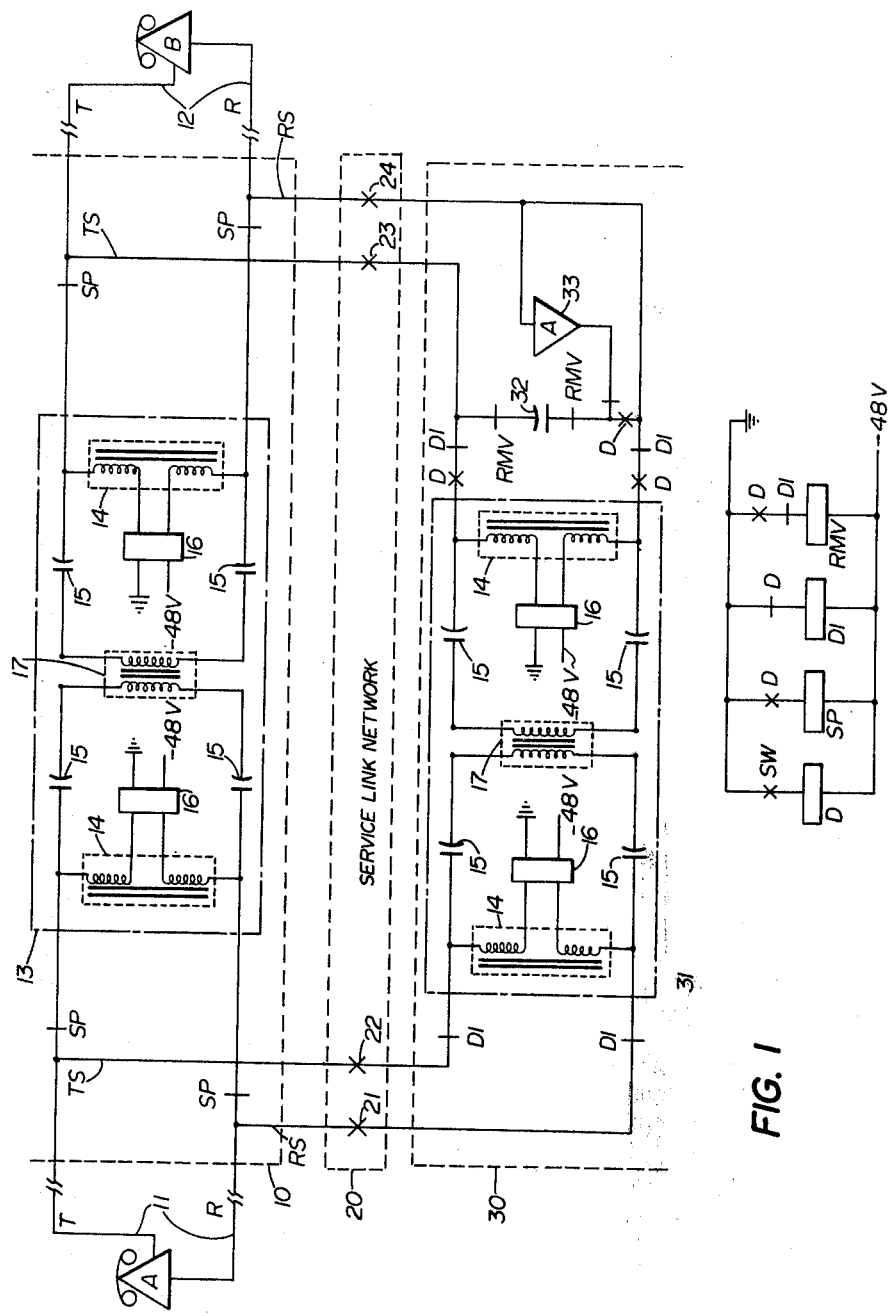
FIG. 1 is a schematic diagram of a telephone apparatus which includes a circuit in accordance with the invention.

FIG. 1 of the drawings employs the conventional method of showing telephone switching apparatus using detached contact notations. Each relay shown in the drawing is given a designation comprising one or more letters, or a combination of letters and digits. In some instances, these designations are purely arbitrary, while in others, they are related to the circuit function of the relay. Relay contacts are shown separated from their associated relays. Contacts which are closed when a relay is operated (make contacts) are represented by an X superimposed on the interconnecting conductors. The two portions of a conductor on opposite sides of the superimposed X are not connected with each other unitl such time as the contacts represented by the X are closed by the associated relay. Contacts which are opened upon the operation of a relay (break contacts) are represented by a short line perpendicular to and intersecting the connecting conductors. The two portions of a conductor on opposite sides of the superimposed break contact symbol are normally connected to each other via the break contacts. The same two conductor portions are disconnected from each other as the break contacts are opened upon the energization of the associated relay.

FIG. 1 is partitioned in three sections: a junctor circuit 10, a service link network 20, and a service circuit 30. All of these circuits illustrate only the circuit details necessary to the description of the invention. The junctor circuit 10 is connected to a calling subscriber A via the tip and ring leads of a telephone line 11 and to a called subscriber B via the tip and ring leads of a telephone line 12. The junctor circuit 10 comprises a supervisory circuit 13 which is switched to the tip and ring leads of both calling and called subscribers via SP break contacts. Each half of the supervisory circuit 13 is shown to comprise a transmission bridge 14, a pair of capacitors 15 and a line supervisory device 16, for example a ferrod. The halves of the circuit 13 are connected through a line isolation transformer 17.

The junctor circuit 10 is shown connected to a service circuit 30 by a pair of leads TS and RS via a service link network 20 and make contacts 21 to 24.

The service circuit 30 comprises a supervisory circuit 31 which is connected to the TS-RS leads via a pair of Dl break contacts on one side. On the other side, it is connected to the TS-RS leads via a pair of Dl break contacts and a pair of D make contacts. The supervisory circuit 31 is shown to include the same circuitry as the supervisory circuit 13 in junctor circuit 10. In addition, the service circuit 30 comprises a capacitor 32 connected to the TS lead through a RMV break contact and to the RS lead through an RMV break contact and a pair of paths, one of which is a D make contact, and the other one of which is a D break contact and a charging circuit 33.

Four relays, D, 5P, Dl, and RMV control the operation of the make and break contacts mentioned above, except for contacts 21 to 24 in the service network 30 and the SW make contacts in the operate path of relay D, which are operated through circuit functions in the common controlling means (not shown) of the central office in which the circuit of FIG. 1 is located.

The capacitor 32 must have a voltage rating sufficient to withstand the switching transients generated in the transfer and must be of a value such that its reactance at voice frequencies is sufficiently low to short out the noise pulses across the telephone line. However, its value must not be so high as to require an unreasonable charging time. For example, a 50 microfarad, 100 and 50 volt electrolytic capacitor has been found to be entirely suitable. The limits of these criteria will become more evident during the description of operation of the circuit of FIG. 1.

Figure 2:
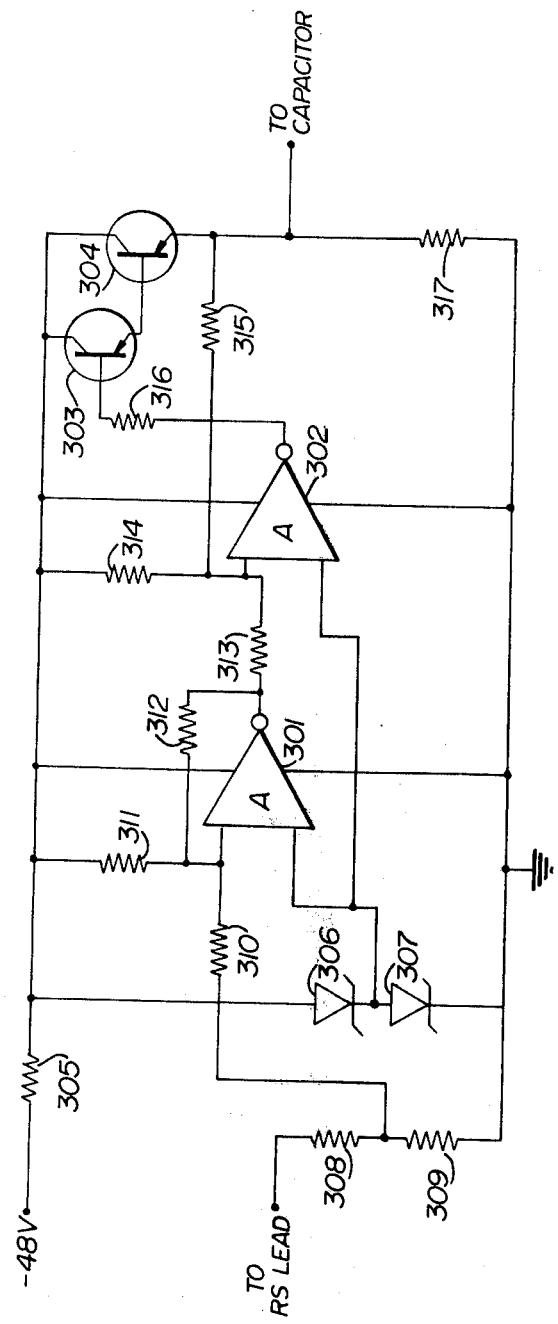
FIG. 2 is a schematic diagram of a sensing circuit which appears in FIG. 1.

The charging circuit 33 should have a high impedance input and a low impedance, high current capability output. FIG. 2 illustrates an amplifier circuit 300 suitable for use as the charging circuit 33 of FIG. 1. The circuit of FIG. 2 is essentially a non-inverting operational amplifier in the voltage follower configuration and providing unity amplification. The circuit provides controlled charging of the capacitor 32. The amplifier circuit 33 consists basically of a pair of operational amplifiers 301 and 302 and a current gate consisting of a pair of bipolar transistors 303, 304 connected in the darlington configuration. The power and reference voltages required by the amplifiers 301, 302 and the transistors 303, 304 is obtained through the use of resistor 305 and zener diodes 306 and 307. A plurality of resistors 308 to 317 serve various functions which will become evident in the following description of operation of the circuit 300 of FIG. 2.

A voltage level on the RS lead is applied to resistors 308 and 309 which have a one to one value ratio. The resulting voltage is applied to the input of amplifier 301 through resistor 310. The amplifier 301 provides a gain in the ratio of resistors 312 and 313 (312/313) which is chosen to be two and this voltage is fed to amplifier 302 which provides a gain of one (resistors 315/316) and drives the current gate consisting of transistors 303 and 304. The output of the current gate is connected to the capacitor 32. Therefore, the circuit of FIG. 2 provides a non-inverting amplifier circuit having unity voltage amplification and high current capability, thereby charging the capacitor to the voltage level which appears on the RS lead.

Figure 3:
FIG. 3 is a sequence diagram illustrating the sequence of operation of the circuit of FIG. 1.

The operation of the circuit of FIG. 1 will now be described in conjunction with FIG. 3. Let us first assume that subscriber A is talking with subscriber B through the supervisory circuit 13 of junctor circuit 10 and that it becomes necessary to transfer the supervision of the call from the junctor circuit 10 to the supervisory circuit 31 of a service circuit 30. For example, this situation occurs in the case where the circuit 30 is a call waiting service circuit, subscriber A subscribes to that service and a third subscriber (not shown) wishes to access subscriber A. In order to let subscriber A know that a third party has dialled his number and is waiting, a tone signal is sent to him. Since this capability is not provided for in a conventional junctor circuit, the call must be transferred to a service circuit which has this capability. However, the portion of the service circuit for providing this capability is not shown in FIG. 1 because it is not relevant to the invention; only the call transfer circuitry of circuit 30 is shown.

On recognition of the need for transferring the call, the common controlling means of the central office operates contacts 21 to 24 in the service link network to extend the subscriber telephone line via leads TS and RS from the junctor circuit 10 to the service circuit 30. This causes the charging circuit 33 and capacitor 32 to be connected across the TS-RS leads and the capacitor 32 to be charged to the voltage level which appears across the tip and ring leads of the telephone line. The common controlling means also causes the SW contacts to close and operate relay D thereby disconnecting the capacitor 32 from the charging circuit 33 and connecting it across the telephone line. Operating relay D causes the energization of relay SP which causes the telephone line to be disconnected from the supervisory circuit 13. A short interval of time later, relay D1 de-energizes to cause the telephone line to be connected to the supervisory circuit 31 and then to cause the relay RMV to be energized thereby disconnecting the capacitor 32 from across the telephone line.

It is preferable to use a charging circuit to charge the capacitor rather than connecting the capacitor directly across the telephone line, for a number of reasons. The charging circuit provides a source of current for charging the capacitor which is independent of the telephone line. Placing a high value capacitor across the telephone line would cause a current surge and tend to generate noise. The charging circuit isolates the capacitor from the telephone line by presenting a high impedance thereto.

In FIG. 1, there is shown a noise suppression circuit connected only at one end of the service circuit 30. However, it is evident that the noise suppression circuit of the invention may be used at the other end of circuit 30 or anywhere else that it is needed.

Therefore, the invention provides a method and circuit for suppressing noise generated in the transfer of a charged telephone line from one supervisory circuit to another.

What is claimed is:

1. In a telephone system comprising a first supervisory circuit and a subscriber telephone line connected thereto, a second supervisory circuit, and means for transferring said telephone line from said first circuit to said second circuit, circuit means for suppressing noise pulses generated upon said transfer comprising, a capacitor, and switch means for connecting the capacitor across said telephone line before it is disconnected from said first circuit, said switch means including means for disconnecting said capacitor from said line a predetermined interval of time subsequent to the transfer.

2. A circuit as defined in claim 1 and further comprising, a charging circuit connected serially with the capacitor for sensing the voltage level at said first circuit when the capacitor is first connected to the telephone line and for charging the capacitor to that voltage level.

3. Telephone apparatus as defined in claim 2 wherein the charging circuit comprises an amplifier circuit having, a high input impedance, a low output impedance and unity voltage amplification.

4. Telephone apparatus as defined in claim 3 wherein said amplifier comprises a pair of operational amplifiers connected in a voltage follower configuration and a current gate comprising a pair of bipolar transistors connected in a darlington configuration.

5. In a telephone system comprising a transmission path including a first supervisory circuit and a subscriber telephone line connected thereto, a second supervisory circuit, and means for transferring said telephone line from said first circuit to said second circuit, circuit means for suppressing noise pulses generated upon said transfer comprising, charge retaining means, and means for sensing the voltage level at said first circuit and for charging said charge retaining means to that level, and switch means for sequentially, connecting the series circuit of said sensing means and said charge retaining means across said telephone line, disconnecting the charge retaining means from the sensing means and connecting it across said telephone line, disconnecting said telephone line from said first supervisory circuit, connecting said telephone line to second supervisory circuit, and disconnecting said charge retaining means from across said telephone line.

6. A circuit as defined in claim 5 wherein the charge retaining means is a capacitor.

7. A circuit as defined in claim 6 wherein the sensing means comprises an amplifier circuit having a high input impedance, a low output impedance and unity voltage amplification.

8. A circuit as defined in cliam 7 wherein said amplifier circuit comprises a pair of operational amplifiers connected in a voltage follower configuration and a current gate comprising a pair of bipolar transistors connected in a darlington configuration.

9. Telephone apparatus comprising, a first supervisory circuit, a subscriber telephone line connected to said first supervisory circuit, a second supervisory circuit, means for transferring said telephone line from said first circuit to said second circuit, a capacitor, switch means for connecting said capacitor across said telephone line before transferring it to said second circuit and for disconnecting said capacitor from said telephone line a predetermined interval of time subsequent to the transfer.

10. Telephone apparatus as defined in claim 9 and further comprising, a charging circuit connected serially with the capacitor for sensing the voltage level across the telephone line when the capacitor is first connected thereto and for charging the capacitor to that voltage level.

11. A method of suppressing switching transients generated by the transfer of a charged telephone line from a first supervisory circuit to a second supervisory circuit comprising the step of:
sensing the voltage level appearing across the telephone line at said first supervisory circuit, and charging a capacitor to said voltage level;
connecting the charged capacitor across said telephone line, and
transferring the telephone line from the first to the second supervisory circuit.

12. In a telephone system comprising a transmission path including a first supervisory circuit and a subscriber telephone line connected thereto, a second supervisory circuit, and means for transferring said telephone line from said first circuit to said second circuit, a method of suppressing noise pulses generated during the transfer, comprising the steps of:
connecting a charging circuit serially connected with a capacitor across said telephone line;
sensing the voltage level appearing across the telephone line at said first supervisory circuit, and charging the capacitor to said voltage level;
disconnecting the charging circuit from the capacitor and connecting the latter across the telephone line;
disconnecting the telephone line from the first supervisory circuit and connecting it to the second supervisory circuit; and
disconnecting the capacitor from the telephone line.

* * * * *